United States Patent [19]

Suzuki

[11] 4,450,926
[45] May 29, 1984

[54] VEHICLE BODY
[75] Inventor: Isao Suzuki, Yokohama, Japan
[73] Assignee: Nissan Motor Co., Ltd., Kanagawa, Japan
[21] Appl. No.: 361,753
[22] Filed: Mar. 25, 1982
[30] Foreign Application Priority Data
Mar. 26, 1981 [JP] Japan ............................ 56-42583[U]
[51] Int. Cl.³ ............................................. B62D 25/20
[52] U.S. Cl. .................................... 180/312; 180/297; 280/796; 296/204
[58] Field of Search ............... 180/311, 312, 297, 300; 280/796, 781; 296/204
[56] References Cited
U.S. PATENT DOCUMENTS
1,548,078  8/1925  Ward .................................... 280/796
1,593,783  7/1926  Stresau ................................. 280/796
2,033,813  3/1936  Broulhiet ............................ 280/796

FOREIGN PATENT DOCUMENTS
2227560  6/1979  Fed. Rep. of Germany ...... 180/312

Primary Examiner—David M. Mitchell
Assistant Examiner—Michael Mar
Attorney, Agent, or Firm—Lowe, King, Price & Becker

[57] ABSTRACT

A vehicle body comprises a stiffener which is arranged in a floor tunnel and has a front end received in a closed section structure formed by a dash lower panel and a dash lower cross member. A rear mounting bracket is secured to the dash lower cross member together with the front end portion of the stiffener and extends forwardly from the dash lower cross member to engage an engine to limit the extent of engine roll.

8 Claims, 9 Drawing Figures

VEHICLE BODY

BACKGROUND OF THE INVENTION

1. Field of the Invention

The present invention relates to a vehicle body, particularly for transverse front engine-front wheel drive automotive vehicles, hereinafter be referred to as an F-F vehicle.

2. Description of the Prior Art

An F-F vehicle, as shown in FIG. 1, is equipped with a rear mounting bracket 10 secured to a dash lower cross member and projects forwardly therefrom to engage an engine by way of an insulator to dampen engine vibrations as well as limiting the extent of engine roll.

FIGS. 2 and 3 show a prior art vehicle underbody equipped with a rear mounting bracket of the above mentioned kind. The structure comprises a dash lower panel 12 and a front floor panel 14 joined at 16 and shaped to define a floor tunnel 18. The tunnel is relatively shallow and extends longitudinally of the vehicle body while being located substantially at the middle of the floor. A dash lower cross member 20 is secured to the dash lower panel 12 and extends transversely of the vehicle body. The dash lower cross member 20 is of channel-like cross section comprising a substantially horizontal bottom wall 20a and a pair of upstanding side walls 20b and 20c. The dash lower cross member 20 is secured at upper flanged ends of the upstanding side walls 20b and 20c to the dash lower panel 12. At a location coinciding floor tunnel 18 the rear upstanding side wall 20c has a protruded portion 20c' shaped to confrom to the cross section of the floor tunnel so that the rear upstanding side wall fits in the floor tunnel without forming any space therebetween. The bottom wall 20a of the dash lower cross member 20 has attached thereto at a location coinciding with the floor tunnel 18 two nuts 22 together with a patch plate 24. Rear mounting bracket 10 is secured to bottom wall 20a of the dash lower cross member 20 by means of bolts 26 screwed into the respective nuts 22. The rear mounting bracket 10 extends forwardly from the dash lower cross member 20 to resiliently engage an engine 29 by way of an insulator 28.

The above described structure, however, has the following disadvantage revealed by experiments conducted by the applicant. That is, in a head-on collision, the dash lower panel 12 tends to be bent at the place joined with the rear upstanding side wall 20c of the dash lower cross member 20 as shown in FIG. 4. Where such bending occurs, the structure cannot offer sufficient resistance against rearward movement of the engine 29 which intrudes relatively easily into passenger compartment 27. The structure therefore cannot provide assured safety for the passengers of the vehicle.

SUMMARY OF THE INVENTION

In accordance with the present invention, there is provided a novel and improved vehicle body which comprises a stiffener arranged in a floor tunnel. The stiffener has a front end portion which is received in a closed section structure formed by a dash lower panel and a dash lower cross member. A rear mounting bracket is secured to the dash lower cross member together with the front end portion of the stiffener and extends forwardly from the dash lower cross member to be connected with or engage an engine to limit the extent of engine roll.

This structure effectively increases the structural strength of the vehicle underbody, particularly against deformation of the dash lower panel toward the passenger compartment, and also exerts a predetermined resistance to such deformation. This enables the passenger compartment to positively retain a predetermined space necessary for passenger safety in the event of collision.

It is accordingly an object of the present invention to provide a novel and improved vehicle body which is free from the foregoing drawbacks inherent in the prior art comparable structure.

It is another object of the present invention to provide a novel and improved vehicle body of the above mentioned character which can positively and assuredly exert predetermined resistance to the deformation of a dash lower panel toward a passenger compartment, thereby preventing an engine from intruding into the passenger compartment and providing assured safety for the passengers.

BRIEF DESCRIPTION OF THE DRAWINGS

The features and advantages of the vehicle body according to the present invention will become more clearly appreciated from the following description taken in conjunction with the accompanying drawings, in which.

DESCRIPTION OF THE PREFERRED EMBODIMENTS

Figure 1:
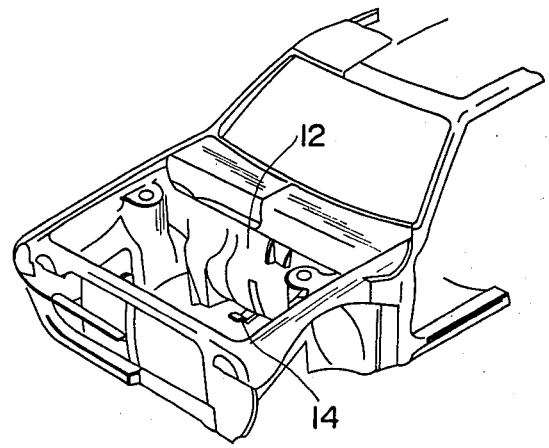
FIG. 1 is a perspective view of a vehicle body, with parts and portions broken away, upon which the present invention is to be applied.
Figure 2:
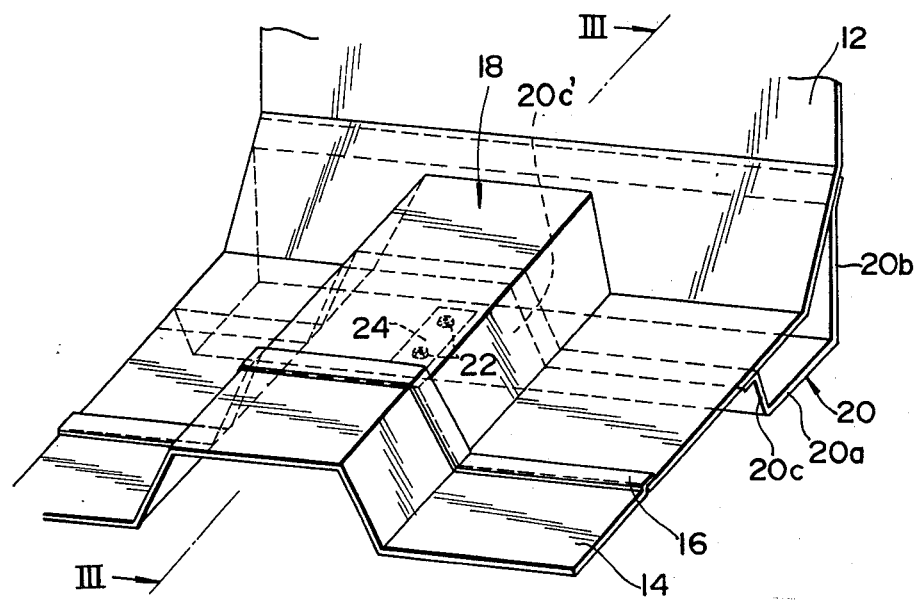
FIG. 2 is a perspective view of a prior art underbody with parts and portions broken away.
Figure 3:
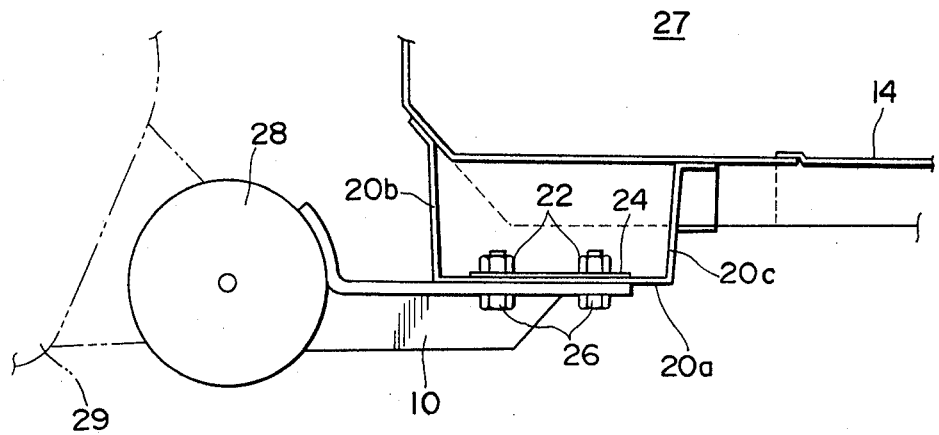
FIG. 3 is a sectional view taken along the line III—III of FIG. 2.
Figure 4:
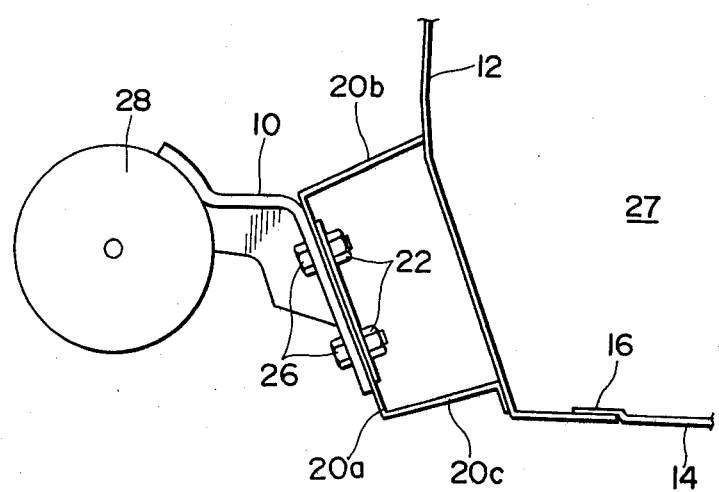
FIG. 4 is a similar view of FIG. 3 but shows the underbody of FIG. 3 in a deformed state upon collision.
Figure 5:
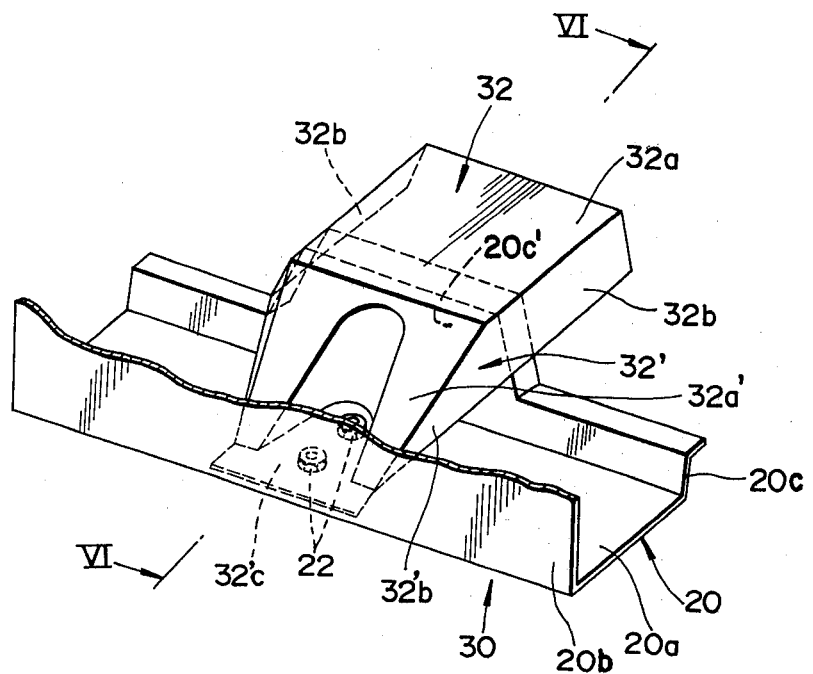
FIG. 5 is a perspective view of an underbody according to an embodiment of the present invention, with parts and portions broken away.
Figure 6:
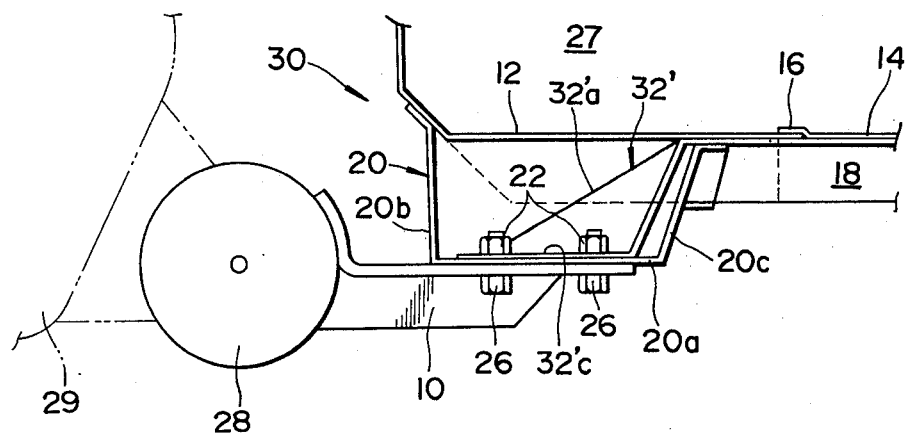
FIG. 6 is a sectional view taken along the line VI—VI of FIG. 5.

Referring now to the drawings, in which like parts to those of the foregoing structures in the "Description of the Prior Art" are designated by like reference characters and will not be described in details again for brevity, and first to FIGS. 5 and 6, a vehicle underbody according to an embodiment of the present invention is generally designated at 30 and shown as comprising a stiffener 32 made of suitable sheet material and in part shaped to conform to the floor tunnel 18 to fit therein. That is, the stiffener 32 is in part of uniform channel-like section comprising a top wall 32a and a pair of depending side walls 32b which are joined with the walls defining the floor tunnel 18, i.e., the walls of the dash lower panel 12 and the front floor panel 14. The rear upstanding side wall protruded portion 20c' of the dash lower cross member 20 is thus shaped to fit the stiffener 32 and secured to the dash lower panel 12 by interposing therebetween the stiffener. The stiffener 32 also has front extension 32' which extends forwardly from the above part of uniform section and projects into the dash lower cross member 20. The forward extension 32' has a wedge-like configuration and comprises an inclined top wall 32a' and a pair of depending side walls 32'b. The top wall 32a' is partially depressed to form a substantially horizontal connecting wall 32'c which is brought into contact with the bottom wall 20a of the dash lower cross member 20 and secured thereto by the bolts 26 and nuts 22 together with the rear mounting bracket 10. That is, the connecting wall 32'c is placed on the upper face of the bottom wall 20a whilst the rear mounting bracket 10 is placed on the lower face of same, and they are fastened together with the bolts and nuts. The stiffener is long enough to extend rearwardly from the front extension 32' so that it is capable of effectively increasing the underbody structural strength at the joint between the dash lower panel 12 and the front floor panel 14. In the above manner, the stiffener 32 is constructed and arranged to intersect the dash lower cross member 20 substantially at right angles and joined integral with same within the closed-section structure as well as the dash lower panel 12 and the front floor panel 14.

With the above structure of this invention, it becomes possible not only to effectively increase the structural strength of the underbody, particularly against the deformation of the dash lower panel toward the passenger compartment but also for the underbody to positively and assuredly exert predetermined resistance to such deformation. This enables the passenger compartment to positively and assuredly retain a predetermined space necessary for the safety of the passengers upon collision. The vehicle body incorporating the present invention thus can provide assured safety for the passengers.

Figure 7:
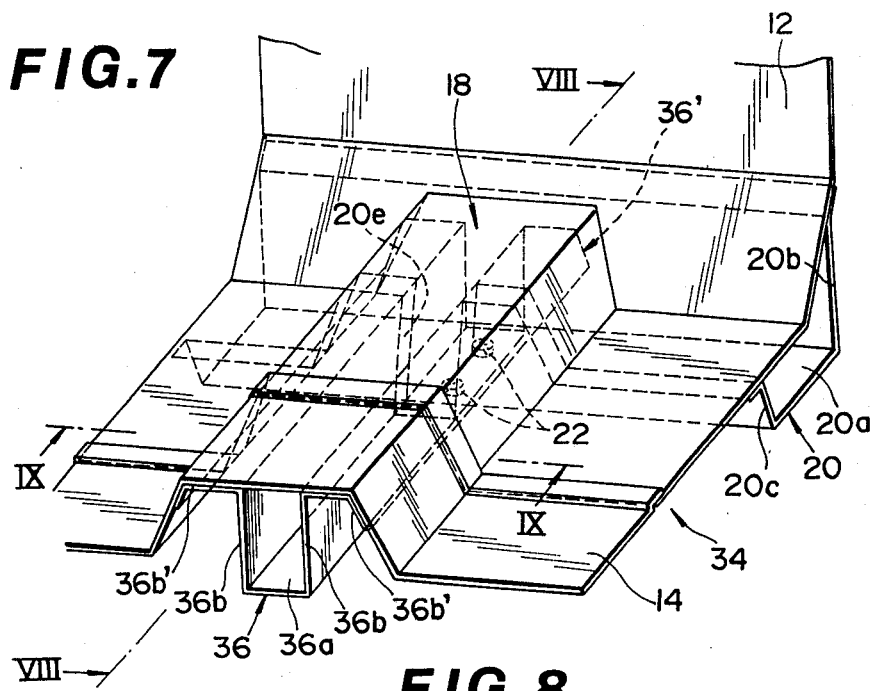
FIG. 7 is a perspective view of an underbody according to another embodiment of the present invention, with parts and portions broken away.
Figure 8:
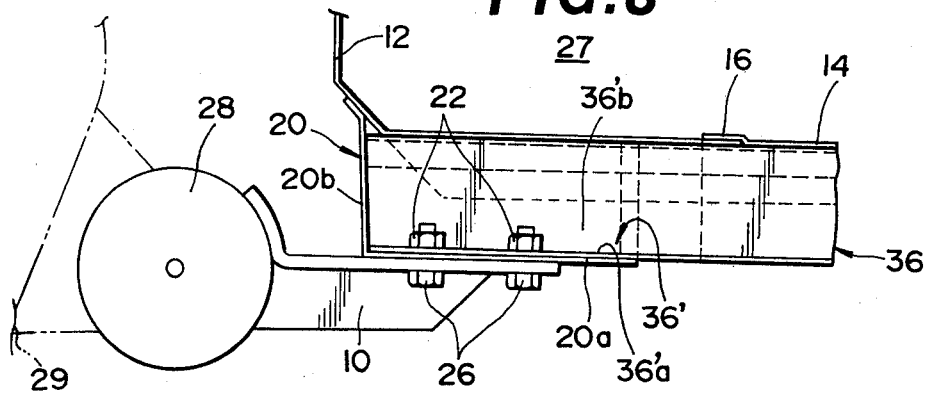
FIG. 8 is a sectional view taken along the line VIII—VIII of FIG. 7.
Figure 9:
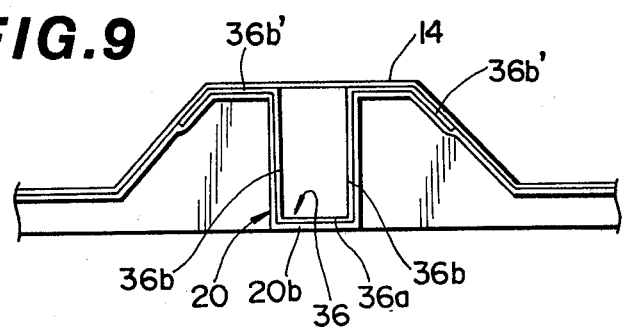
FIG. 9 is a sectional view taken along the line IX—IX of FIG. 7.

Referring to FIGS. 7 to 9, a vehicle underbody according to another embodiment of the present invention is generally designated at 34 and shown as comprising a stiffener 36 made of suitable sheet material and shaped to have a uniform channel-like section comprising a bottom wall 36a and a pair of upstanding side walls 36b. The upstanding side walls 36b have upper flanged ends 36b' shaped to conform to the floor tunnel 18 to fit therein. That is, the upper flanged ends 36b' are shaped to extend along the horizontal wall of the tunnel 18 and thenceforth along the respective depending side walls of same. The stiffener 36 has a front end part 36' received in the closed-section structure formed by the dash lower panel 12 and the dash lower cross member 20. That is, the front end part 36' is secured at the bottom wall 36'a to the bottom wall 20a of dash lower cross member 20 and also at the upstanding wall upper flanged ends 36b' to the tunnel defining walls of the dash lower panel 12. For this sake, the rear upstanding wall 20c of the dash lower cross member 20 is formed with a notch 20e and in part shaped to conform to the cross section of the stiffener to fit thereon. The rear upstanding wall 20c is secured even at the part thereof fitting on the stiffener 36 to the dash lower panel 12. The rear mounting bracket 10 is placed on the lower face of the dash lower cross member bottom wall 20a with the front end part bottom wall 36'a of the stiffener 36 being on the upper face of same and secured thereto by the bolts and nuts 26 and 22. The stiffener is long enough to extend rearwardly from the front end part 36' thereof so that it is capable of effectively increasing the underbody structural strength at joint 16 between the dash lower panel 12 and the front floor panel 14. In the above manner, the stiffener 36 is constructed and arranged to intersect the dash lower cross member 20 substantially at right angles and joined integral with the dash lower cross member, within the closed-section structure, as well as the dash lower panel 12 and the front floor panel 14.

The embodiment of FIGS. 7 and 9 can produce substantially the same effect as the previous embodiment.

Obviously, many variations and modifications of the present invention are possible in light of the above teachings. It is, therefore, to be understood that within the scope of the appended claims, the invention may be practiced otherwise than as specifically described.

What is claimed is:

1. A vehicle body comprising a dash lower panel; a dash lower cross member attached to said dash lower panel and extending transversely of the vehicle body, said dash lower cross member having a channel-like section and cooperating with said dash lower panel to form a closed-section structure; a front floor panel secured to a rear margin of said dash lower panel, said dash lower panel and said front floor panel being formed with a common floor tunnel which extends longitudinally of the vehicle body and is located substantially at a middle portion of the dash lower panel and the front floor panel; a stiffener made of sheet material and shaped to conform to the cross section of said floor tunnel, said stiffener being arranged in said floor tunnel and secured to tunnel-defining walls of said dash lower panel and said front floor panel, said stiffener having a front end portion received in said closed section structure, said front end portion having a bottom wall secured to a bottom wall of the dash lower cross member, said stiffener also including a portion extending rearwardly from the front end portion and having side wall means connected to tunnel defining side walls of the dash lower panel; and a rear mounting bracket secured to said dash lower cross member together with the front end portion of said stiffener, said rear mounting bracket extending forwardly from said dash lower cross member to engage an engine to limit the extent of engine roll.

2. A vehicle body as set forth in claim 1, wherein said front end portion of said stiffener intersects said dash lower cross member substantially at right angles.

3. A vehicle body as set forth in claim 2, wherein said dash lower cross member includes a substantially horizontal bottom wall and a pair of front and rear upstanding side walls, said upstanding side walls having upper flanged ends secured to said dash lower panel.

4. A vehicle body as set forth in claim 3, wherein said rearwardly extending portion of said stiffener includes a portion of uniform channel-like section extending rearwardly from said front end portion beyond a joint formed between said dash lower panel and said front floor panel, said uniform channel-like section having a top wall and a pair of depending side walls secured to the tunnel-defining walls of said lower panel and said front floor panel.

5. A vehicle body as set forth in claim 4, wherein said front end portion of said stiffener has a wedge-like configuration and includes an inclined top wall and a pair of depending side walls, said inclined top wall being partially depressed to form a substantially horizontal connecting wall being said bottom wall secured to the bottom wall of said dash lower cross member.

6. A vehicle body as set forth in claim 3, wherein said rearwardly extending portion of said stiffener extends beyond a joint formed between said dash lower panel and said front floor panel, said front end and rearwardly extending portions of said stiffener being of uniform channel-like section having a bottom wall and a pair of upstanding side walls, said upstanding side walls having upper flanged ends shaped to conform to the floor tunnel and secured to the tunnel-defining walls of said dash lower panel and said front floor panel, said front end portion being secured at the bottom wall thereof to the bottom wall of said dash lower cross member.

7. A vehicle body as set forth in claim 4 or 6, wherein said upper flanged end of said rear upstanding side wall of said dash lower cross member is in part shaped to conform to a mating part of said stiffener to fit said part and in part secured to said dash lower panel by interposing therebetween said stiffener.

8. A vehicle body as set forth in claim 1, wherein said rear mounting bracket is connected to the engine by an insulator.

* * * * *